3,335,192
PROCESS FOR PREPARING FLUORONITROSO LOWER ALKANES
John E. Paustian, Whippany, and Marvin M. Fein, Westfield, N.J., assignors to Thiokol Chemical Corporation, Bristol, Pa., a corporation of Delaware
No Drawing. Filed Aug. 8, 1966, Ser. No. 570,740
5 Claims. (Cl. 260—647)

ABSTRACT OF THE DISCLOSURE

Vapor phase pyrolytic decomposition of a fluoro-lower acyl nitrite to form a fluoronitroso lower alkane by contacting the nitrite at atmospheric pressure with an inert refluxing liquid boiling above 150° C., e.g. pyrolytic decomposition of trifluoroacetyl nitrite to trifluoronitroso methane by contact with a refluxing triperhalo alkyl amine.

---

This application is a continuation-in-part of Ser. No. 465,786 filed June 21, 1965, now abandoned.

This invention relates to an improved process for preparing fluoronitroso lower alkanes. Fluoronitroso lower alkanes such as trifluoronitrosomethane and trifluoronitrosoethane are important intermediates in the preparation of nitroso rubbers. Nitroso rubbers are highly valued for certain commercial and military applications because of an unusual combination of properties. They have good resistance to chemical attack and have excellent retention of their elastomeric properties at extremely low (about −50° C.) temperatures. For instance, trifluoronitrosomethane can be copolymerized with tetrafluoroethylene to yield a nitroso rubber having good chemical resistance and an extremely low glass transition temperature.

The prior art synthetic procedures heretofore available for the preparation of fluoronitroso lower alkanes such as trifluoronitrosomethane generally involve the batchwise photolytic or pyrolytic decomposition of trifluoroacetyl nitrite and have been less than satisfactory in several respects.

The photolysis processes are inefficient and cumbersome when operated on a large scale and require costly and not readily obtainable equipment. Moreover, trifluoronitrosomethane is sensitive to radiation and, because of this, loss of product is encountered in any photolytic process.

Similarly, pyrolysis processes have several disadvantages. For instance, most prior art pyrolysis processes utilize undiluted or "neat" trifluoroacetyl nitrite as starting material. This material is especially sensitive to detonation and in this respect can be considered an explosive. The too rigorous pyrolysis of this substance frequently has resulted in detonation.

U.S. Patent 3,162,692 to Crawford discusses the explosion dangers inherent in the pyrolytic decomposition of pure trifluoroacetyl nitrite and proposes a liquid phase pyrolysis in the presence of a refluxing perhalofluorocarbon solvent. In the Crawford process, the solvents used are chosen to have a normal boiling point at a temperature (70°–98° C.) lower than the boiling point (99° C.) of the trifluoroacetyl nitrite. Refluxing of the solvent is performed at a pyrolysis temperature of 150°–170° under sufficient pressure (50–100 p.s.i.g.) to keep the less volatile trifluoroacetyl nitrite in the liquid phase. The pyrolysis product, trifluoronitrosomethane, escapes from the reaction zone in vapor form.

The danger of explosion in the Crawford process is minimized by always keeping the trifluoroacetyl nitrite reactant in the liquid phase where it is diluted by admixture with the perhalofluorocarbon solvent employed. Thus, (1) the use of a solvent, (2) the use of a solvent more volatile than trifluoroacetyl nitrite, and (3) the use of pressure keeping the nitrite in the liquid phase are all critical to the success of the Crawford process.

The need for pressurized apparatus makes such a process economically unattractive, and the art has sought other techniques involving pyrolysis at normal pressures. For example, an inert gas such as nitrogen has been passed through a heated reservoir of trifluoroacetyl nitrite to entrain vapors of the reactant, which vapors are then pyrolyzed at high temperatures. While dilution of the vapors of the starting material with an inert gas reduces the danger of vapor phase detonations, the possibility of liquid phase detonations remains undiminished. Moreover, the reaction product must be separated from large volumes of inert gas, which inevitably results in a loss of product and low yields (10–30 percent of theory).

Finally, in the attempt to reduce detonations, pyrolysis has also been conducted under subatmospheric pressures. Unfortunately, vacuum operations require the use of pyrolysis tubes having an unusually large length to diameter ratio. Because of this requirement, the cost of scaling up to commercial quantity production is prohibitive.

Because of the deficiencies of the prior art pyrolytic and photolytic processes, there is a need for an improved process for preparing fluoronitroso lower alkanes. Ideally, an improved process would lend itself to continuous operation utilizing standard and commercially available production equipment, would produce products in good (75% and higher) yield and, finally, would preclude accidental detonation.

Thus, it is an object of this invention, among others, to provide a process for preparing fluoronitroso lower alkanes without the danger of explosive detonation.

It is a further object of this invention to prepare fluoronitroso lower alkanes such as trifluoronitrosomethane in good yield and free from contaminants.

An additional object of this invention is the development of a novel synthetic process which can be operated at moderate temperatures at atmospheric or near atmospheric pressures without the need for photolytic, high temperature, vacuum, or other costly special process equipment.

Further advantages will become apparent to those skilled in the art upon a further perusal of this application.

According to the present invention, a fluoro-lower-acyl nitrite in the liquid phase is brought into contact in a reactor with a refluxing inert liquid, the reflux temperature of which is sufficient immediately to vaporize the nitrite and to decompose the nitrite vapors to form a fluoronitroso alkane product. Vapors of undecomposed starting material and of the inert liquid are condensed and returned to the reactor. Vapors of the pyrolysis product pass through the condenser and are conveniently purged by a stream of inert gas, suitably a gas boiling below liquid nitrogen temperatures. The mixture of purge gas and gaseous product suitably is taken through scrubbers and absorbers where undesired reaction products are removed and then into a liquid nitrogen trap where the product is condensed and the purge gas passes off.

For example, trifluoroacetyl nitrite ($CF_3CO_2NO$) is brought into contact with a refluxing inert liquid at a reflux temperature between about 150°–200° C. at atmospheric pressure. Vaporization occurs, then decomposition. Under the conditions of pressure and temperature above the refluxing solvent surface, complete decomposition takes place in 1–10 minutes. A heat exchanger above the decomposition chamber condenses the inert liquid and undecomposed nitrite, which are returned for recycle. The gaseous decomposition product enters a stream of helium for transport through the desired purification traps and into the collection cylinder where it is condensed at liquid nitrogen temperature.

It will be evident from this specification that the pyrolysis of the invention occurs in the vapor phase, and not in the liquid phase. Explosions in the vapor phase are inherently discouraged by the dilution of fluoro-acyl nitrite vapors with vapors of the refluxing inert liquid. Explosions in the liquid phase are minimized by the avoidance of local accumulations of liquid nitrite in the reactor, primarily by a proper rate of feed of nitrite to the reactor. Since large quantities of nitrite are not accumulated in the liquid phase, the refluxing inert liquid need not be a diluting solvent for the nitrite. While solvents for the fluoro-acyl nitrite can be used as the refluxing liquid, this is not critical to the invention, as it is in prior art processes. A wide range of suitable inert liquids is, thus, available for use. Also, it will be clear that liquids with normal boiling points above the boiling point of the nitrite reactant are used according to the invention, since the boiling liquid acts to vaporize the nitrite and its vapors must dilute the nitrite vapors. The process obviates the need for reservoirs of nitrite at elevated temperatures and does not involve the separation of small amounts of product from large volumes of an inert gaseous diluent, both of which are disadvantages of prior art gas entrainment techniques.

The process of the invention is advantageous for the reasons set forth above. In addition, the process offers reasonable flexibility in reaction conditions and reactants. The most significant of the reaction conditions are set forth below.

*Temperature.*—The process of the invention preferably takes place at a reflux temperature of about 150°–200° C. While temperatures lower than 150° C. can be employed, lower temperatures are not favored since yields are reduced and reaction times are unduly lengthened. On the other hand, temperature substantially above about 200° C. are preferably avoided because the danger of explosion is increased and competing side reactions adversely affect yields.

*Pressures.*—Near atmospheric pressures are favored. No apparent advantage has been found in using lower pressures (vacuums), while superatmospheric pressures require costly process equipment without any concurrent gain in yield.

*Inert Liquid.*—As indicated previously, the preferred reaction temperatures ranges between about 150°–200° C. Therefore the liquid utilized as the refluxing agent should be nonreactive with the product or starting material, have a boiling point no lower than this temperature, and have good thermal stability. A convenient means of keeping the reaction temperature within a desired range is to use an inert liquid which refluxes within the desired range. The preferred liquid is triperfluorobutylamine, which refluxes at 184° C. Satisfactory high boiling inert liquids include, among others, the triperhaloalkylamines such as triperfluoropropylamine, triperfluoropentylamine, triperchloropropylamine, triperchlorobutylamine, triperchloropentylamine, as well as the corresponding bromo and chlorofluoro derivatives. As the inert liquid is, in effect, only a heat transfer medium, it does not contribute to the reaction and its volume is constant. Since the decomposition occurs predominantly in the vapor phase, solubility of the nitrite in the liquid is not required, as already noted.

*Starting Materials.*—While the preferred nitrite ester is trifluoroacetyl nitrite (CF₃CO₂NO) the homologous higher nitrite esters such as CF₃CF₂CO₂NO,

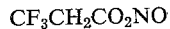

and CF₃(CH₂)₂CO₂NO can be used. Trifluoroacetyl nitrite and the other nitrites are known compounds. For example, CF₃CO₂NO is disclosed in the following reports:

(1) Minnesota Mining and Mfg. Company, U.S. Army Contract DA–19–129–QM–1043 Summary Report, August 15, 1960.
(2) C. W. Taylor, T. J. Brice and R. L. Wear, J. Org. Chem. 27, 1064–66 (1962).

The higher homologues can be found in the chemical literature such as Chemical Abstracts.

*Purge Gas.*—While an inert purge gas is not essential to this invention, it facilitates transfer of the product stream to the purification system. The gas used is one which is not condensed in the traps used to collect the product.

A better understanding of the present invention and of its many advantages will be had by referring to the following specific examples, given by way of illustration.

EXAMPLE 1

13.88 parts by weight of trifluoro-acetyl nitrite are slowly added over a period of one hour to refluxing trifluorobutylamine (B.P. 184° C.) in a reaction vessel equipped with a condenser. An immediate change in the color of the yellow CF₃CO₂NO to green to blue is observed in the vapor phase between the refluxing liquid amine and the condenser. From the top of the condenser, the gaseous reaction products, including blue CF₃NO, are pushed by a stream of helium through a water scrubber, a 5% caustic scrubber, a drying column, a molecular sieve column maintained at −80° to −100° C., and finally to a condenser maintained at −196° C. The condensate (4.96 parts by weight) is a blue, viscous liquid at −196° C. Analysis by mass spectrometry and gas chromatography shows that the product is CF₃NO of greater than 99% purity. A 51.6% yield based on the weight of starting material is obtained.

EXAMPLE 2

The next higher homologue, CF₃CF₂NO, is prepared using the same apparatus and purification procedure described above. In this embodiment, 10 parts by weight of CF₃CF₂CO₂NO are contacted with refluxing triperfluoroamine at a rate such that the nitrile ester is vaporized as before in the refluxing amine. Again, the pyrolysis of the nitrite ester takes place in the vapor phase and the gaseous decomposition products are withdrawn from the top of the reflux column. Unreacted starting material and amine are returned to the vaporization vessel by condensation while a stream of helium gas carries the gaseous product stream through the previously enumerated water and caustic scrubber, drying column, and collection traps until final condensation and isolation. Analytical evidence confirms the preparation of CF₃CF₂NO.

As the foregoing discussion and embodiment indicate, numerous modifications and changes can be made without departing from the inventive concept.

What is claimed is:

1. A process for preparing a fluoronitroso lower alkane by vapor phase decomposition of a fluoro-lower acyl nitrite which process comprises contacting said fluoro-lower acyl nitrite with a refluxing inert liquid at substantially atmospheric pressure, said inert liquid boiling above about 150° C. at atmospheric pressure, whereby said fluoro-lower acyl nitrite is vaporized and decomposed in the vapor phase to products including said fluoronitroso lower alkane, and thereafter isolating said fluoronitroso lower alkane.

2. A process as in claim 1 wherein said fluoro-lower acyl nitrite is trifluoroacetyl nitrite which is decomposed to trifluoronitroso methane.

3. A process as in claim 1 wherein said inert liquid is a triperhalo alkyl amine.

4. A process as in claim 1 wherein said inert liquid is a triperfluoro alkyl amine.

5. A process as in claim 1 wherein said inert liquid is a triperfluoro butyl amine.

References Cited

UNITED STATES PATENTS 3,162,692  12/1964  Crawford, et al. _____ 260—647

CARL D. QUARFORTH, *Primary Examiner.*

L. A. SEBASTIAN, *Assistant Examiner.*